United States Patent
Mariggis

(10) Patent No.: US 6,628,658 B1
(45) Date of Patent: Sep. 30, 2003

(54) TIME-CRITICAL CONTROL OF DATA TO A SEQUENTIALLY CONTROLLED INTERFACE WITH ASYNCHRONOUS DATA TRANSMISSION

(75) Inventor: Athanase Mariggis, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,206

(22) PCT Filed: Feb. 9, 2000

(86) PCT No.: PCT/DE00/00392
§ 371 (c)(1),
(2), (4) Date: Dec. 26, 2001

(87) PCT Pub. No.: WO00/51398
PCT Pub. Date: Aug. 31, 2000

(30) Foreign Application Priority Data

Feb. 23, 1999 (DE) ........................................... 199 07 731
Jun. 8, 1999 (DE) ........................................... 199 26 103

(51) Int. Cl.[7] ............................................. H04L 12/28
(52) U.S. Cl. .................................... 370/395.1; 370/389
(58) Field of Search ............................. 370/395.1, 389, 370/467, 466, 396–399

(56) References Cited

U.S. PATENT DOCUMENTS

| | | | |
|---|---|---|---|
| 5,485,456 A | | 1/1996 | Shtayer et al. |
| 5,784,370 A | | 7/1998 | Rich |
| 6,075,788 A | * | 6/2000 | Vogel .......................... 370/395 |
| 6,147,997 A | * | 11/2000 | Holden et al. .............. 370/395 |
| 6,356,557 B1 | * | 3/2002 | Nichols et al. ............. 370/449 |
| 6,381,245 B1 | * | 4/2002 | Hann et al. ............... 370/395.6 |

OTHER PUBLICATIONS

"The ATM Forum, Technical Committee" Utopia Level 2, Version1. Jun. 1995.
"The ATM Forum, Technical Committee" Utopia Leve 3, Baseline Text Dec. 1998.

* cited by examiner

Primary Examiner—Kenneth Vanderpuye
(74) Attorney, Agent, or Firm—Morrison & Foerster LLP

(57) ABSTRACT

A ready signal(RxClav) that is generated by at least one physical layer(PL) and a release-lock signal (RxEnb) that is generated by an additional layer (ATM-L) are transmitted via an asynchronous interface (utopia), whereby a reaction in response to the change of the release clock signal (RxEnb)) or the ready signal (RxClav) occurs within at least one elemenrtary period (Fx). According to the invention, the release-lock signal is dispalyed to the physical layer(PL) when said signal is delayed by one elementary period (Fx). The data (DW) which are to be transmitted parallel can be controlled to the sequentially controlled interface.

18 Claims, 4 Drawing Sheets

TIME-CRITICAL CONTROL OF DATA TO A SEQUENTIALLY CONTROLLED INTERFACE WITH ASYNCHRONOUS DATA TRANSMISSION

CLAIM FOR PRIORITY

This application claims priority to International Application No. PCT/DE00/00392 which was published in the German Language on Aug. 31, 2000.

TECHNICAL FIELD OF THE INVENTION

The invention relates to a method and a circuit arrangement for the time-critical routing of data to a clocked interface with asynchronous data transmission.

BACKGROUND OF THE INVENTION

In existing and future communication, systems, in particular communications systems operating according to the asynchronous transfer mode (ATM), data is and will be transmitted in a cell stream formed from cells or IP (Internet Protocol) packets. Specifically in the case of communications systems which operate according to the asynchronous transfer mode, the ATM layer model is used for functionally dividing the communications tasks, the ATM layer model being composed, like the OSI (Open Systems Interconnection) reference model from a plurality of communications layers which are independent of one another. These include the physical layer, the ATM layer, the ATM adaptation layer (AAL) and the user-oriented layers designated as "higher layers" in the OSI terminology. The function of a layer is to make available services for the next higher layer. In particular, the physical layer makes available a transmission interface for the cells of the superordinate ATM layer. This interface has been defined by the ATM forum as a uniform, clocked interface between the physical layer and the higher layers of communications devices which operate according to the asynchronous transfer mode, the interface being known in the specialist field by the name "Universal Test and Operation PHY-interface for ATM" or "Utopia" for short—see in particular ATM Forum, Level 2, v1.0, June 1995, pages 8–15 and 21–24.

In this UTOPIA Level 2 interface which is standardized by the ATM Forum, during the routing of the data to the interface very critical signaling occurs which gives rise to a number of technical implementation problems, particularly in the upstream direction, i.e. from the physical interface—also referred to as secondary side—to the communications system—also called primary side. Inter alia, the UTOPIA specification requires, for example, setup times of at least 4 nsec for a 50 MHz UTOPIA interface and hold times of at least 1 nsec. Owing to these setup and hold time requirements, all the signaling signals must be sampled at the input end immediately in order to be able to initiate the reaction to the signaling signals in the subsequent clock period, i.e. the signaling between the primary side and the secondary side is very time-critical. Furthermore, the standardized UTOPIA Level 2 interface standardizes a plurality of different complex signaling operations, the processing of which requires a complex control logic owing to their number. The implementation of such rapid reaction times and the implementation of the required complex control logic requires suitable hardware support, i.e. high speed logic modules such as ASICs (Application Specific Integrated Circuit) or high speed, small FPGAs (Field Programmable Gate Array) with short, internal signal transit times.

In the case of the standardized UTOPIA Level 2 interface, in particular the "Multiphysical" UTOPIA Level 2, there is additionally provision for a plurality of physical interfaces to be connected to the ATM layer, which requires address decoding and control with respect to the physical layer which is to be addressed. Furthermore, the previously described complexity of the different signaling operations in the case of a "multiphysical" operation of the UTOPIA interface is considerably increased, i.e. a complex and time-critical routing and decoding logic is necessary for the time-critical routing of data from a plurality of physical layers to the one ATM layer owing to the large number of different complex signaling operations and the selection of the physical layer which is authorized to transmit data in each case.

SUMMARY OF THE INVENTION

The invention relates to a method and a circuit arrangement for the time-critical routing of data to a clocked interface with asynchronous data transmission, there being parallel transmission of data between a physical layer, or at least one physical layer, and a further layer in accordance with a standardized layer model, of a ready signal which is generated by the physical layer and which indicates or does not indicate a data transmission request, and of a release/blocking signal which is generated by the further layer in order to route the data transmission and/or if appropriate of a plurality of address signals which are generated by the further layer. In addition, a reaction to a change in the release/blocking signal or in the ready signal occurs within at least one clock period.

In one embodiment of the invention, there is time-critical routing of the data to a clocked interface with asynchronous data transmission, in particular the interface between a physical layer, or between a plurality of physical layers, and the ATM layer.

In one aspect of the invention, the release/blocking signal is indicated to the physical layer delayed by one clock period, and the data to be transmitted in parallel is routed a priori to the clocked interface by the physical layer, and a reload signal for routing the data to the interface in a suitably timed and clocked fashion is generated by a logic connection of the delayed release/blocking signal and of the ready signal which is generated by the physical layer. The delaying of the release/blocking signal which is generated by the further layer and the subsequent logic connection of the delayed release/blocking signal to the ready signal which is generated by the physical layer enables very short reaction times to be obtained in different signaling operations. As a result, the number of the signaling scenarios or cases standardized by the ATM Forum is reduced to one case, i.e. the different time-critical signaling operations which occur during the operation of the interface are processed by the method according to the invention using a single, simple control logic. This means that no additional cost-intensive, high speed logic modules such as FPGAs for implementing a complex control logic are necessary to implement the method according to the invention but instead simple standard logic modules such as gates and flipflops can be used. In particular, the signaling requirements of future UTOPIA standards which are already in planning, for example UTOPIA Level 3 —see ATM Forum PHY WG, UTOPIA Level 3 Baseline Text, December 1998—with maximum clock rates of virtually 104 MHz and data bus widths of 32 bits can be advantageously realized using the method according to the invention, especially since in the field it is considered impractical to realize a complex control logic which is necessary to implement the UTOPIA Level 2 and 3 Standard without the method according to the invention with logic functions which are currently available in ASICs or high speed, small FPGAs owing to the extremely short signal transit times which are required.

According to another embodiment of the invention, when there is a reload signal which indicates a data transmission, further data is routed to the interface, and when there is a reload signal which indicates no data transmission, the currently present data and no further data is routed to the interface. As a result, data is routed to the interface in a particularly advantageous way after the transmission of the currently present data by the delayed release or blocking signal has already taken place, i.e. further data is routed to the interface immediately after the transmission of the currently present data. In addition, this ensures that no data can be reloaded from the physical layer to the clocked interface without a ready signal which indicates a data request or a reload signal which indicates a data release.

The logic connection of the delayed release/blocking signal and of the ready signal generated by the decentralized device is advantageously carried out according to the invention by means of a logic AND connection. A logic AND connection constitutes a "high speed" logic connection and can be implemented easily, i.e. without a large degree of expenditure on circuitry.

One advantage of the invention is that the data to be transmitted is routed a priori to the clocked interface by the physical layer without a data transmission release of the physical layer being indicated by the further layer using the release/blocking signal. As a result of premature routing of the data to be transmitted to the interface by the physical layer, data is already present a priori at the interface, i.e. from the point of view of the physical layer data is already being transmitted. However, ultimately the delayed release/blocking signal directly brings about a data transmission, i.e. when a release/blocking signal which indicates a data transmission is present the currently present data is transmitted and further data is routed to the interface. The invention thus complies with the reaction time required for data to be applied to the interface after reception of the release and blocking signal which indicates a data transmission.

Another aspect of the invention is the fact that the release/blocking signal is indicated to the physical layer delayed by at least one clock period, and that the address signals are delayed by at least one clock period and the ready signal which is to be indicated to the further layer at a given time is selected by reference to the delayed address signals and routed to the interface. Furthermore, the data which is to be transmitted in parallel is routed from the respective physical layer to the clocked interface a priori and as a function of the address signals and the release/blocking signal, and immediately sampled. In addition, at least one first and one second reload signal for routing the data to the interface in a suitably timed and clocked fashion are generated by respective logic connections of the delayed release/blocking signal and of the delayed address signals for a physical layer in each case. As a result of the delaying of the release/blocking signal generated by the further layer, and of the address signals, very short reaction times are obtained for different signaling operations, especially since, when the release/blocking signal does not signal a data transmission, the physical layer which is authorized for transmission at a given time is determined by reference to the address signals which are present, and said physical layer directly routes its first data byte to the interface. The data, currently selected on the basis of the address signals, of the respective physical layer is thus directly present at the interface, as a result of which the short reaction times which are required by the UTOPIA interface standard can be realized. As a result, the multiplicity of signaling scenarios or cases which are standardized by the ATM Forum is reduced to a small number of cases, i.e. the different, time-critical signaling operations which occur during the operation of the interface and the selection of the respective physical layer are processed the invention using a single simple routing and decoding logic. This means that, in order to implement the invention, no cost-intensive, high speed logic modules, such as high speed ASICs or small, high speed FPGAs are necessary to implement a complex routing and decoding logic, but rather it is possible to use simple, cost-effective, relatively slow ASICs or FPGAs. In particular, the signaling requirements of future UTOPIA standards which are already in planning, for example MPHY-UTOPIA Level 3—see ATM Forum PHY WG, UTOPIA Level 3 Baseline Text, December 1998—with maximum clock rates of virtually 104 MHz and data bus widths of 32 bits can be advantageously implemented using the method according to the invention, especially since an implementation of a complex control logic which is necessary to implement the UTOPIA level 2 and 3 Standard, in particular in the case of "multiphysical" operation is considered to be impractical in the specialist field without the method according to the invention with logic functions which are currently available in ASICs or high speed, small FPGAs, owing to the extremely short signal transit times which are required.

According to still another embodiment of the invention, when there is a first reload signal which indicates a data transmission previously stored data is routed to the interface, and when there is a second reload signal which indicates a data transmission further data is routed to the interface. Furthermore, when there is a first or second reload signal which indicates no data transmission, the currently present data and no further data is routed to the interface, and data is routed to the interface either using the first or the second reload signal. As a result, the data to be transmitted is routed to the interface in a particularly advantageous way, in particular after the transmission of the currently present data by the delayed release/blocking signal has already taken place, i.e. further data is routed to the interface immediately after the transmission of the currently present data. In addition, this ensures that no data is reloaded from the physical layer to the clocked interface without a ready signal which indicates a data request or a first or second reload signal which indicates a data release. Furthermore, data which has already been stored in a memory unit is advantageously routed by the first reload signal, i.e. for example the first data word or data byte of an ATM cell, or the cell start signal which is present, is buffered in a memory unit in the current clock cycle and read out in the next clock cycle if requested and routed directly to the interface. In this way, data which is required in the next clock period and is no longer currently present can be particularly advantageously routed at short notice to the interface, as a result of which, for example, the loss of a data byte or of an information item which is present in the current clock period but is required at a given time is avoided.

The logic connections of the delayed release/blocking signal and of the delayed and decoded address signals for a physical layer in each case is advantageously carried out according to the invention using a decoding unit—i.e. the embodiment can be implemented without a large degree of expenditure on circuitry. Furthermore, the signal transit times are kept short by implementing the decoding unit on a single logic level.

Another advantage of the invention is that data, to be transmitted, of the physical layer selected by reference to the address signals is routed a priori to the clocked interface from the respective physical layer without the further layer indicating a data transmission release for the respective physical layer using the release/blocking signal by reference to the address signals generated by the further layer for addressing the respective physical layer. By virtue of the premature routing of the data to be transmitted from the respective physical layer to the interface, data is already present a priori at the interface, i.e. from the point of view of the respective physical layer data is already being transmitted; but the delayed release/blocking signal directly brings about a data transmission, i.e. when a release/blocking signal which indicates a data transmission is present, the data which is currently present is transmitted and further data is routed to the interface. The invention thus ensures the short reaction time which is required for the application of data of the physical layer defined by the address signals to the interface after reception of the release/blocking signal which indicates a data transmission.

BRIEF DESCRIPTION OF THE DRAWINGS

The invention is explained in more detail below with reference to two block circuit diagrams and two signal flowcharts.

DETAILED DESCRIPTION OF THE INVENTION

Figure 1:
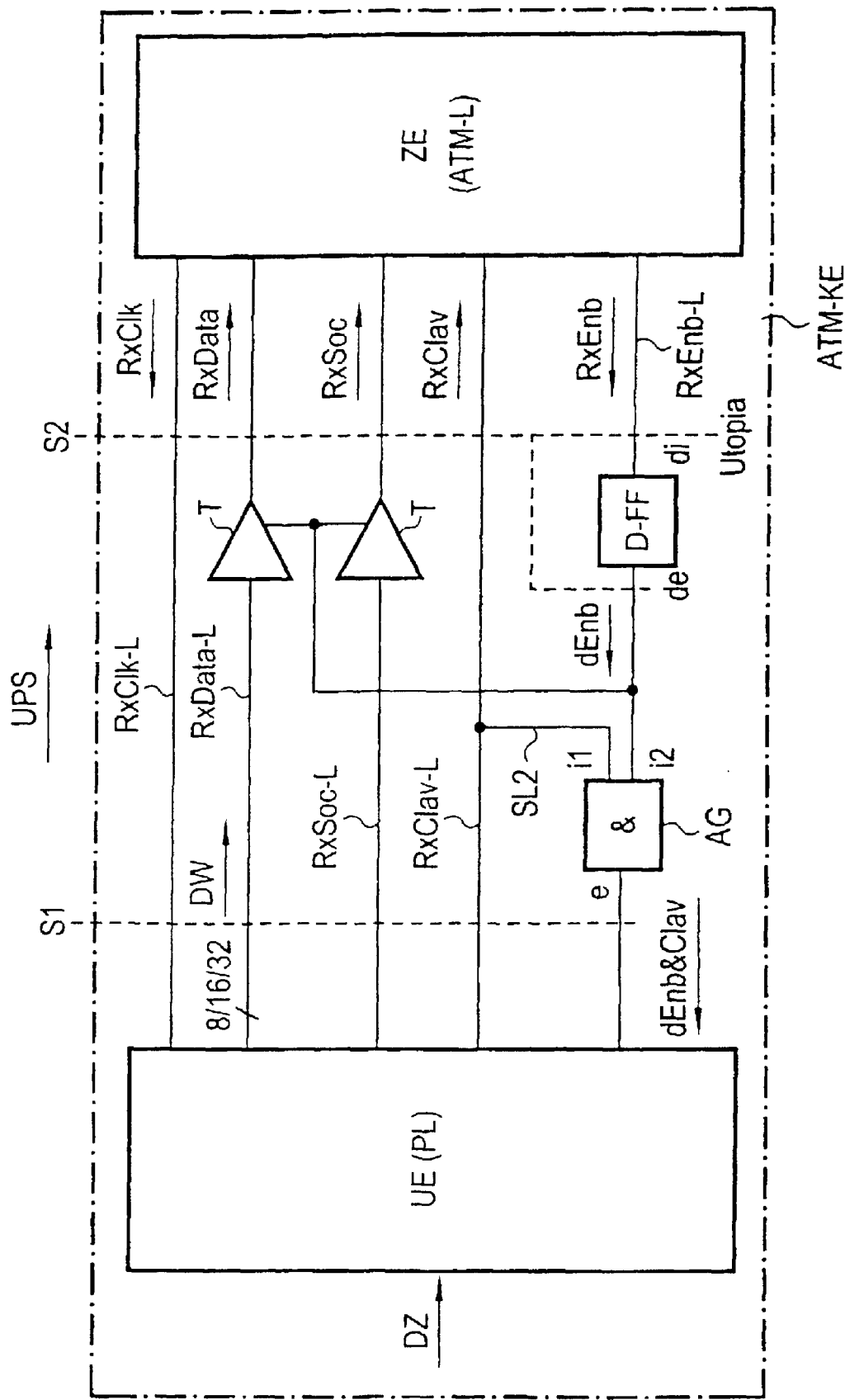
FIG. 1 is a block circuit diagram showing a circuit arrangement developed for implementing the invention.

The block circuit diagram according to FIG. 1 shows an ATM communications device ATM-KE which operates according to the asynchronous transfer mode, with a transmission unit UE which implements a physical layer PL, and an access unit ZE which implements an ATM layer ATM-L, the physical layer PL providing the transmission equipment which is necessary for the transmission of data cells DZ, and the ATM layer ATM-L having higher network protocols for the functional separation of communications functions. In particular, FIG. 1 shows a possible implementation of the Utopia interface, standardized by the ATM Forum, between the physical layer PL and the ATM layer ATM-L -also referred to as UTOPIA interface, the circuit arrangement according to the invention and/or the method according to the invention relates specifically to the time-critical routing of data cells DZ to the clocked Utopia interface for parallel transmission in the upstream direction UPS. Here, the upstream direction UPS is to be understood as the parallel transmission of data cells DZ starting from the physical layer PL to the ATM layer ATM-L. For the parallel transmission of the data cells DZ, they are divided into data words DW, each with a length of 8, 16 or 32 bits, and subsequently a single data word DW1 per clock period Fx is transmitted in parallel, a clock period Fx comprising in each case the period between two successive rising clock edges F1–F8. Furthermore, the interface lines RxClk-L, RxData-L, RxSoc-L. RxClav-L, RxEnb-L which are provided for the implementation of the UTOPIA interface defined by the ATM Forum are illustrated in FIG. 1. Here, the clock signal RxClk is transmitted via the clock signal interface line RxClk-L, the data-signal RxData is transmitted via the data signal interface line RxData-L, the cell start signal RxSoc is transmitted via the cell start signal interface line RxSoc-L, the ready signal RxClav is transmitted via the ready signal interface line RxClav-L, and the release/blocking signal RxEnb is transmitted via the release or blocking signal interface line RxEnb-L, the respective direction of the signal transmission being defined by the directions of the arrows given in FIG. 1.

The superordinate or controlling entity within the clocked interface is formed, as illustrated by way of example in FIG. 1, by the ATM layer ATM-L, i.e. the parallel data transmission is routed, and the data transmission started or terminated, by the ATM layer ATM-L using the release/blocking signal RxEnb. Furthermore, the physical layer PL which is subordinate to the ATM layer ATM-L routes the data to be transmitted in the form of data cells DZ or data words DW to the clocked interface Utopia, in which case, on the one hand, the ATM layer ATM-L makes the physical layer PL prepare data words DW, but on the other hand data words DW are routed to the interface even without a data request by the physical layer PL to the ATM layer ATM-L. The transmission of the data words DW from the physical layer PL to the ATM layer ATM-L is carried out using the data signal RxData, via which one 8-bit, 16-bit or 32-bit data word DW can be transmitted per clock period Fx. Furthermore, the ATM layer ATM-L indicates or predefines to the physical layer PL the clock rate for the clocked, parallel data transmission by the-clock signal RxClk. In addition, a cell start signal RxSoc is provided on a standard basis for the implementation of the Utopia interface and is used by the physical layer PL to indicate to the ATM layer ATM-L the start of a new data cell, i.e. in particular the transmission of the first data word DW1 of a data cell. This means that during parallel transmission of the first data word DW1 of a data cell, from the point of view of the ATM layer ATM-L the cell start signal RxSoc which has the logic value "0" is set to the logic value "1" for the duration of one clock period Fx, and as a result the start of a data cell is signaled to the ATM layer ATM-L. If data is present, or even if no data is present, for parallel transmission to the ATM layer ATM-L in the physical layer PL, this is indicated to the ATM layer ATM-L using the ready signal RxClav. In order to implement the invention, a delay means D-FF, for example a D-flipflop for delaying the release/blocking signal RxEnb generated by the ATM layer ATM-L for routing the data transmission is provided, the release/blocking signal RxEnb which is generated by the ATM layer ATM-L being routed to the input di of the delay means D-FF using the release and blocking signal interface line RxEnb-L, and the release/blocking signal dEnb which is delayed by one clock period Fx being present at the output de of the delay means D-FF.

In compliance with the UTOPIA interface standard, tristate driver modules T which act in the upstream direction UPS with respect to the Utopia interface are provided for connecting through the cell start signal RxSoc and the data signal RxData to the ATM layer ATM-L, as shown in FIG. 1. The tristate driver modules T can route the cell start signal interface line RxSoc-L and the data signal interface line RxData-L into the "tri-stated" or "high impedance" state, and the transmission of the cell start signal RxSoc or of the data signal RxData can thus be prevented. This is the case in particular if no data transmission of the superordinate ATM layer ATM-L is provided, and the tristate driver modules T can thus be made, using the delayed release/blocking signal dEnb transmitted via a first control line SL1, to change the cell start signal interface line RxSoc-L and the data signal interface line RxData-L into the "tri-stated" state.

A logic connecting device AG, for example an AND gate, is provided for implementing the logic connection, according to the invention, of the ready signal RxClav and of the delayed release/blocking signal dEnb. The ready signal RxClav is routed, using the second control line SL2, to the first input i1 of the logic connecting device AG, the input i1 being connected via a second control line SL2 to the ready signal interface line RxClav-L, and the delayed release/blocking signal dEnb is routed, using the release or blocking signal interface line RxEnb-L, to the second input i2 which is connected to the output de of the delay means D-FF via the release or blocking signal interface line RxEnb-L, and after the AND connection of the two signals a reload signal dEnb&Clav for routing the data words DW to the Utopia interface in a suitably timed and clocked fashion is present at the output e of the logic connecting device AG. The reload signal dEnb&Clav indicates to the physical layer PL that a further data word DW can be routed to the Utopia interface.

Figure 2:
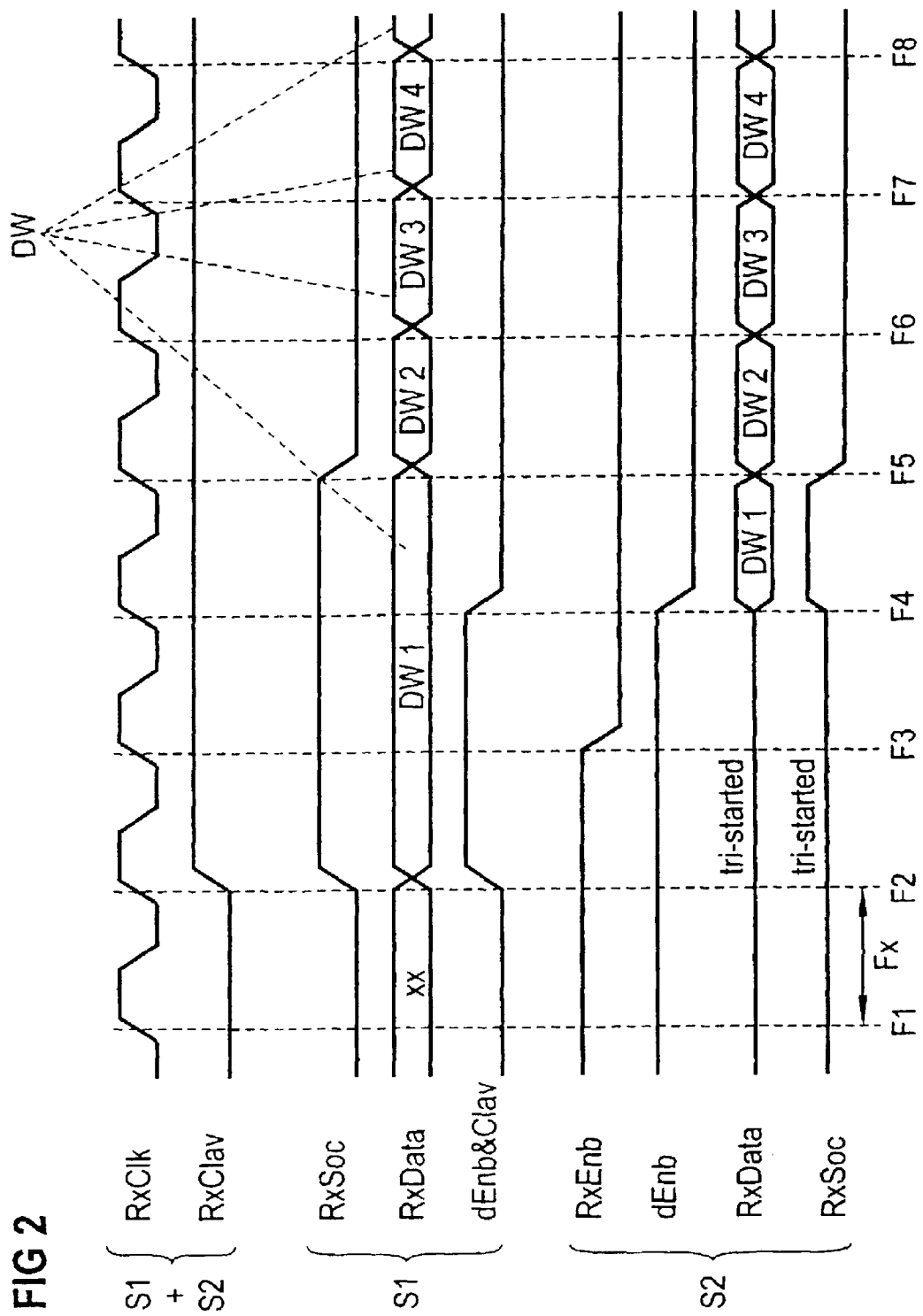
FIG. 2 shows the signal flow at the clocked interface.

The signal flow which occurs during the time-critical routing, according to the invention, of data words DW to the clocked interface is illustrated in FIG. 2 by means of individual signal flowcharts. In compliance with the UTOPIA interface standard, the signaling signals RxClk, RxData, RxSoc, RxClav, RxEnb are each sampled after a rising clock pulse edge F1–F8, for example a first, second, third, fourth, fifth, sixth, seventh and eighth rising clock pulse edge F1–F8 being illustrated in FIG. 2. In order to explain the invention, eight clock periods Fx are shown between the first and eighth positive clock edge F1–F8, an individual clock edge F1–F8 being indicated in each case by a dotted line. Furthermore, FIG. 2 shows the signal profiles of the signaling signals RxClk, RxData, RxSoc, RxClav, RxEnb, dEnb, dEnb&Clav immediately after the physical layer PL—expressed in FIG. 1 by a dot-dashed line designated by S1—and at the Utopia interface—expressed in FIG. 1 by a dashed line designated by S2 or Utopia—and are referred to below as first interface S1 and as second interface S2. The signal profiles in the plane S1 and/or S2 of the clock signal RxClk, of the data signal RxData, of the cell start signal RxSoc, of the ready signal RxClav, of the release/blocking signal RxEnb, of the delayed release/blocking signal dEnb and of the reload signal dEnb&Clav are explained in more detail by FIG. 2.

At the time of the first rising clock pulse edge F1, the ready signal RxClav, having the logic value "0", of the ATM layer ATM-L indicates that at that time there are no data words DW available for parallel transmission in the physical layer PL. Analogously, the data signal RxData at the first interface Si does not indicate the presence of any data words DW and owing to the release/blocking signal RxEnb which does not indicate any data transmission and which has the logic value "1", both the data signal RxData and the cell start signal RxSoc are changed to the "tri-stated" state at the second interface S2 or Utopia interface using the tristate driver modules T at the time of the first rising clock pulse edge F1. This means that the data transmission to the ATM layer ATM-L is interrupted. Correspondingly, the delayed release/blocking signal dEnb has a logic value "1"—no data transmission—and the reload signal dEnb&Clav has a logic value "0", by which a release of the UTOPIA interfaces, i.e. data words DW can be routed to the UTOPIA interface, is indicated to the physical layer PL.

At the time of the second rising clock pulse edge F2, the cell start signal RxSoc is set to the logic value "1" by the physical layer PL at the first interface S1, and the start of a data cell DZ or the presence of a first data word DW1 in the physical layer PL is thus indicated. In contrast, the cell start signal interface line RxSoc-L is still kept in the "tri-stated" state at the second interface B by the tristate driver module T, and the transmission of the cell start signal RxSoc to the ATM layer ATM-L is thus suppressed. Furthermore, the first data word DW1 is routed to the first interface S1 using the data signal RxData, the data signal interface line RxData-L being also still held in the "tri-stated" state here again at the second interface S2 by the tristate driver module T. The physical layer PL signals a data transmission request to the ATM layer ATM-L, or indicates readiness to transmit data, by means of the ready signal RxClav present in unchanged form at both the first and second interfaces. The ready signal RxClav is kept constant over the following six periods, i.e. signals a data transmission request. The release/blocking signal RxEnb, and consequently the delayed release/blocking signal dEnb, continue to have an unchanged logic value "1" at the second interface B—no data transmission. In contrast, the logic value of the reload signal dEnb&Clav has changed from "0" to "1", after which the physical layer PL can no longer reload any data words DW to the Utopia interface, i.e. only the currently present first data word DW1 is made available for the transmission.

At the time of the third rising clock edge F3, the previously mentioned signal profiles remain unchanged with the exception of the release/blocking signal RxEnb which is present at the second interface S2, by means of which the ATM layer ATM-L reacts to the change, occurring one clock period Fx before, in the ready signal RxClav which indicates a data transmission request. As a result, the ATM layer ATM-L carries out a release, using the release/blocking signal RxEnb, for the transmission of data via the Utopia interface.

This release for the transmission of data becomes effective at the time of the fourth rising clock pulse edge F4 owing to the release/blocking signal dEnb delayed at the switching interface S2, i.e. a delayed release/blocking signal dEnb with a logic value "0" is present, which, using the tristate driver modules T, releases the first data word DW1 for transmission. Consequently, the first data word DW1 at the second interface S2 is then transmitted to the ATM layer ATM-L using the RxData data signal, the start of the data cell being signaled to the ATM layer ATM-L simultaneously by the cell start signal RxSoc. Furthermore, the reload signal dEnb&Clav at the first interface S1 has a change in the logic value from "1" to "0". This means that for example a second data word DW2 can be reloaded to the UTOPIA interface by the physical layer PL in the following clock period Fx.

At the time of the following fifth clock pulse edge F5, the cell start signal RxSoc is reset to the logic value "0" and assumes this logic value without change until the transmission of a further data cell takes place. The second data word DW2 is transmitted to the ATM layer ATM-L in the upstream direction UPS using the data signal RxData. Analogously, the third and fourth data words DW3, DW4 are transmitted in the respective following clock period Fx.

Figure 3:
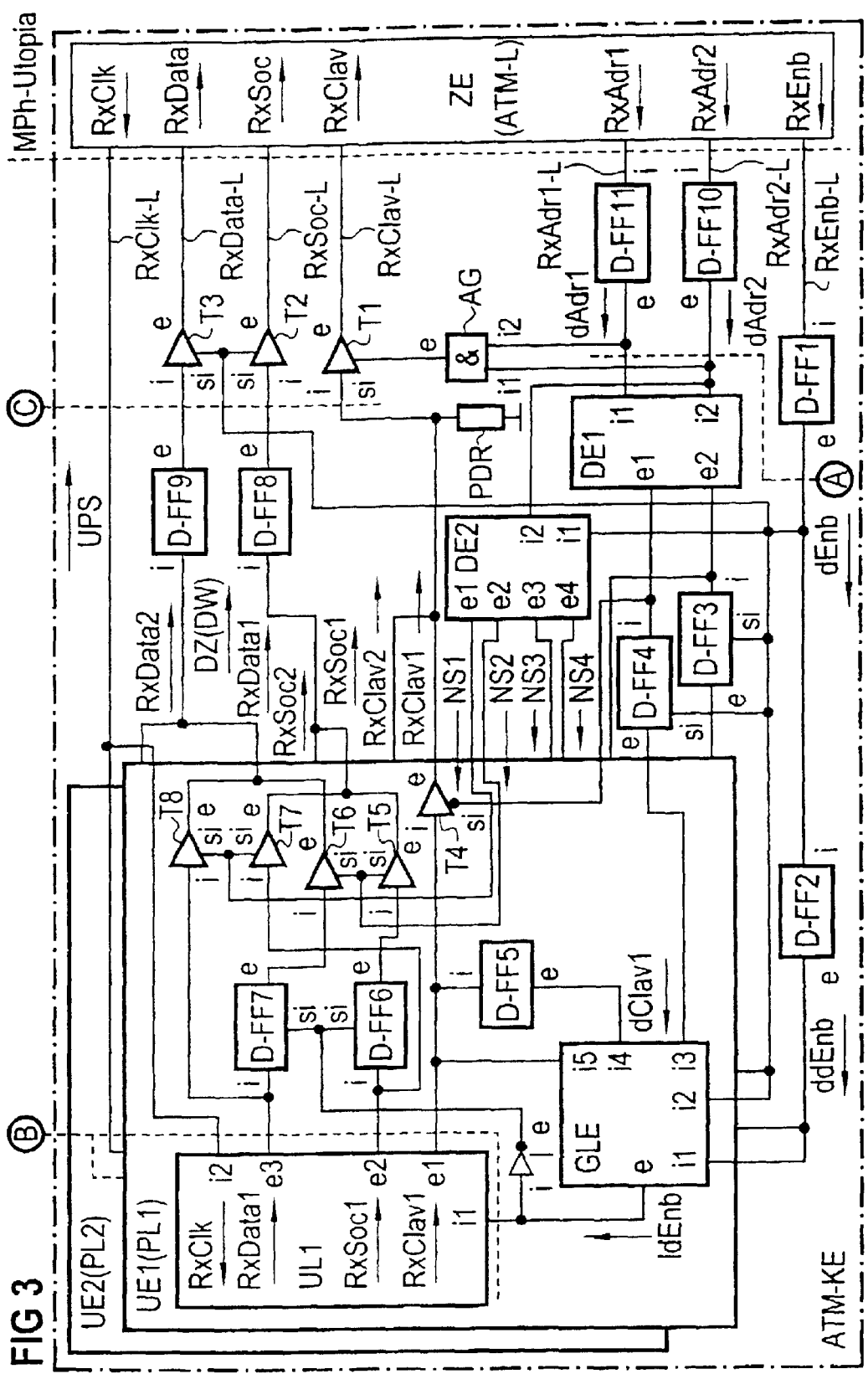
FIG. 3 is a block circuit diagram showing a circuit arrangement according to the invention of a "multiphysical" UTOPIA interface.

The block circuit diagram according to FIG. 3 shows, by analogy with FIG. 1, an ATM communications device ATM-KE which operates according to the asynchronous transfer mode, with a first transmission unit UE1 which implements a first physical layer PL1, a second transmission unit UE2 which implements a second physical layer PL2 and an access unit ZE which implements the ATM layer ATM-L, the first and second physical layers PL1, PL2 providing the transmission equipment which is necessary for the transmission of data cells DZ, and the ATM layer ATM-L having higher network protocols for the functional separation of the communications functions. In particular, FIG. 3 shows a possible way of implementing the Utopia Level 2 interface which is standardized by the ATM Forum between, for example, the first and second physical layer PL1, PL2, and the ATM layer ATM-L—also referred to as "multiphysical"—UTOPIA interface, the circuit arrangement or the method according to the invention specifically relating to the time-critical routing of data cells DZ to the clocked MPh-Utopia interface for parallel transmission in the upstream direction UPS. In particular, for example the first and second physical layers PL1, PL2 are illustrated in FIG. 3, the method according to the invention being applicable for routing data of any desired number of physical layers PL1, PL2 to the ATM layer ATM-L. Here, by analogy with FIG. 1, the upstream direction UPS is to be understood to mean the parallel transmission of data cells DZ starting from one of the physical layers PL1, PL2 to the ATM layer ATM-L. Furthermore, FIG. 3 shows in turn the interface lines RxClk-L, RxData-L, RxSoc-L, RxClav-L, RxEnb-L, RxAdr1, RxAdr2 provided for implementing the "multiphysical" UTOPIA interface defined by the ATM Forum, the first and second address signals RxAdr1/RxAdr2 being additionally transmitted via a first and second address signal interface line RxAdr1/RxAdr2 in order to implement the "multiphysical" Utopia MPh-Utopia interface. Here too, the arrows illustrated in FIG. 3 represent the respective direction of the signal transmission.

The superordinate or controlling entity within the clocked interface is formed, by analogy to FIG. 1, by the ATM layer ATM-L as illustrated by way of example in FIG. 3, i.e. using the release/blocking signal RxEnb and the first and second address signals RxAdr1/RxAdr2, the ATM layer ATM-L routes the parallel data transmission and/or selects the first or second physical layer PL1, PL2 and starts or terminates the data transmission. Furthermore, the first and second physical layers PL1, PL2 which are subordinate to the ATM layer ATM-L route the data to be transmitted in the form of data cells DZ or data words DW to the clocked MPh-Utopia interface, in which case, on the one hand, the ATM layer ATM-L makes the respective first or second physical layer PL1/PL2 prepare data words DW, but on the other hand the first or second physical layer PL1, PL2 routes data words DW to the interface even without a data request to the ATM layer ATM-L. The data words DW are transmitted from the first or second physical layer PL1, PL2 to the ATM layer ATM-L using the data signal RxData via which one 8-bit, 16-bit or 32-bit data word DW per clock period Fx can be transmitted. Furthermore, by analogy to FIG. 1, the ATM layer ATM-L can indicate or predefine the clock rate for the clocked, parallel data transmission both to the first and second physical layers PL1, PL2 by means of the clock signal RxClk. In addition, a cell start signal RxSoc is also provided on a standard basis for the implementation of the MPh-Utopia interface and is used by the first or second physical layer PL1, PL2 of the ATM layer ATM-L to indicate the start of a new data cell DZ, i.e. in particular the transmission of the first data word DW1 of a data cell. This means that during the parallel transmission of the first data word DW1 of a data cell, from the point of view of the ATM layer ATM-L the cell start signal RxSoc which has the logic value "0" is set to the logic value "1" for the duration of one clock period Fx and as a result the start of a data cell of the respective physical layer PL1, PL2 which is selected by reference to the first and second address signals RxAdr1/RxAdr2 most recently present is signaled to the ATM layer ATM-L. If data are present, or even if no data are present, for parallel transmission to the ATM layer ATM-L in the first or second physical layer PL1, PL2, this is indicated to the ATM layer ATM-L using the ready signal RxClav.

In order to explain the invention, by way of example the transmission of data from the first physical layer PL1 to the ATM layer ATM-L will be described. The transmission of data starting from the second physical layer PL2 and the structure of the second transmission unit UE2 is analogous to the first physical layer PL1 or the first transmission unit UE1 and is consequently not described in detail below.

In order to implement the the invention, first to eleventh delay elements D-FF1–D-FF11 for example D-flipflops, are provided for delaying the respective signals to be transmitted, the delay elements D-FF1–D-FF11 each having an input and output i/e and some have an additional control input si. The fifth, sixth and seventh delay elements D-FF5–D-FF7 are arranged, for example, in the first transmission unit UE1 of the first physical layer PL1. In the exemplary embodiment according to FIG. 3 which is described in more detail, the third, fourth, sixth and seventh delay elements D-FF3/4/6/7, for example, have an additional control input si. In addition, the first transmission unit UE1 comprises a Utopia Level 1 interface unit UL1 for implementing the Utopia Level 1 interface, and a glue logic unit GLE for controlling the signaling operations, defined by the UTOPIA interface standard, of different transmission methods or events during the transmission of ATM cells. Furthermore, a fourth to eighth tristate driver module T4–T8 for -connecting through the respective signals and an inverter I are provided in the first physical layer PL1. In order to implement the selection according to the invention of the first or second physical layer PL1, PL2, a first, and a second decoding unit DE1, DE2 and a first, second and third tristate driver module T1–T3 for switching through the signals which are present are provided in the ATM communications device ATM-KE. In addition, a pull-down resistor PDR and a logic connection device AG, for example an "AND" gate for advantageously routing the data to the clocked MPh-Utopia interface, are arranged in the ATM communications device ATM-KE.

The access unit ZE which implements the ATM layer ATM-L is connected via the release/blocking signal interface line RxEnb-L to the input i of a first delay element D-FF1. The output e of the first delay element D-FF1 is routed via a further release/blocking signal interface line RxEnb-L to the input i of a second delay element D-FF2, the further release/blocking signal interface line RxEnb-L which is connected to the output e of the first delay element D-FF1 being connected to the first input i1 of the second decoding unit DE2. The output e of the second delay element D-FF2 is connected to the first input i1 of the glue logic unit GLE of the first physical layer PL1. Analogously, the output e of the second delay element D-FF2 is wired to the first input i1 of the glue logic unit GLE of the second physical layer PL2—not illustrated in FIG. 3. Furthermore, the output e of the first delay element D-FF1 is also connected to, in each case, the second input i2 of the glue logic unit GLE of the first or second physical layer PL1, PL2. In addition, the control input si of the third and fourth delay elements D-FF3, D-FF4 is connected to the output e of the first delay element D-FF1. In each case the control unit si of the second and third tristate driver modules T2/T3 is also connected to the output e of the first delay element D-FF1.

The access unit ZE is connected to the input i of the eleventh delay means D-FF11 via the first address signal interface line RxAdr1-L. The output e of the eleventh delay element D-FF11 is connected to the first input i1 of the first decoding unit DE1 and to the second input i2 of the logic connection device AG. Analogously, the access unit ZE is connected to the input i of the tenth delay element D-FF10 via the second address signal interface line RxAdr2-L, and the output e of the tenth delay element D-FF10 is connected both to the second input i2 of the first decoding unit DE1 and to the first input i1 of the logic connection device AG, as well as to the second input i2 of the second decoding unit DE2. The output e of the logic connection device AG is itself connected to the control input si of the first tristate driver module T1.

The access unit ZE is additionally connected via the clock signal interface line RxClk-L to the first and second physical layers PL1, PL2, in particular to the respective Utopia Level 1 interface unit UL1 in order to transmit the clock signal RxClk from the ATM layer ATM-L to the first or second physical layer PL1, PL2.

The first output e1 of the first decoding unit DE1 is routed to the input i of the fourth delay element D-FF4 and to the inverted control input si of the fourth tristate driver module T4. The second output e2 of the first decoding unit DE1 is connected to the input i of the third delay element D-FF3 and to the inverted control input si of a tristate driver module of the second physical layer PL2—not illustrated in FIG. 3. Furthermore, the output e of the fourth delay element D-FF4 is connected to the third input i3 of the glue logic unit GLE. Analogously, the output e of the third delay element D-FF3 is connected to the glue logic unit GLE of the second physical layer PL2—not illustrated in FIG. 3 either.

The first output e1 of the second decoding unit DE2 is connected to the control input si of the seventh and eighth tristate driver modules T7, T8, and the second output e2 of the second decoding unit DE2 is connected to the control input of the fifth and sixth tristate driver modules T5/6 using a connecting line in each case. Analogously, the third and fourth outputs e3/e4 of the second decoding unit DE2 are routed to control inputs of tristate driver modules of the second physical layer PL2, the control inputs not being illustrated in FIG. 3 for reasons of clarity.

The glue logic unit GLE which is provided in the first transmission unit UE1 has an output e which is connected to the first input of the Utopia Level 1 interface unit UL1 and to the input i of the inverter I. The output e of the inverter I is connected to the control input si of the sixth and seventh delay elements D-FF6, D-FF7. The first output e1 of the Utopia Level 1 interface unit UL1 is connected to the input i of the fourth tristate driver module T4 and to the fifth input i5 of the glue logic unit GLE and to the input i of the fifth delay element D-FF5, the output e of the fifth delay element D-FF5 being routed to the fourth input i4 of the glue logic unit GLE.

The second output e2 of the Utopia Level 1 interface unit UL1 is connected to the input i of the sixth delay element D-FF6 and to the input i of the seventh tristate driver device T7, the output e of the sixth delay element D-FF6 being routed to the input i of the fifth tristate driver device T5. Furthermore, a connection is provided between the third output e3 of the Utopia Level 1 interface unit UL1 and the input i of the seventh delay element D-FF7, the output e of the seventh delay element D-FF7 being connected to the seventh tristate driver module T6. In addition, the third output e3 of the Utopia Level 1 interface unit UL1 is connected to the input i of the eighth tristate driver module T8. The two outputs e of the fifth and seventh tristate driver modules T5, T7 are connected to the input i of the eighth delay element D-FF8, the outputs of the corresponding tristate driver means that are arranged on the second physical layer PL2 also being connected to the input i of the eighth delay element D-FF8. The outputs e of the sixth and eighth tristate driver modules T6, T8 being connected to the input i of the ninth delay element D-FF9, the outputs of the corresponding tristate driver means which are arranged on the second physical layer PL2 being in turn connected to the input i of the ninth delay element D-FF9. The output e of the eighth delay element D-FF8 is connected to the input i of the second tristate driver module T2, and the output e of the ninth delay element D-FF9 is routed to the input i of the third tristate driver module T3. The access unit ZE which implements the ATM layer ATM-L is connected to the output e of the second tristate driver module T2 via the cell start signal interface line RxSoc-L. Furthermore, the access unit ZE is connected to the output e of the third tristate driver module T3 via the data signal interface line RxData-L.

The output e of the fourth tristate driver module T4 is connected, together with the output e of the tristate driver module which is analogously arranged in the second physical layer PL2, to the input i of the first tristate driver module T1 which is connected to ground via a pull-down resistor PDR. Furthermore, the control unit si of the first tristate driver module T1 is connected to the output e of the logic connection device AG.

In compliance with the UTOPIA interface standard, the first, second and third tristate driver modules T1–T3 which operate in the upstream direction UPS with respect to the MPh-Utopia interface are, as illustrated in FIG. 3, provided for switching through the cell start signal RxSoc or the data signal RxData or the ready signal RxClav to the ATM layer ATM-L. The first, second and third tristate driver modules T1–T3 can respectively change the cell start signal interface line RxSoc-L and the data signal interface line RxData-L and the ready signal interface line RxClav-L to the "tri-stated" state or "high impedance" state, and the transmission of the cell start signal RxSoc or of the data signal RxData or of the ready signal RxClav can thus be routed or prevented. This is the case in particular if no data is to be transmitted by the superordinate ATM layer ATM-L, and the second and third tristate driver modules T2, T3 are thus made to change the cell start signal interface line RxSoc-L and the data signal interface line RxData-L to the "tri-stated" state using the delayed release/blocking signal dEnb. Analogously, the fourth, fifth, sixth, seventh and eighth tristate driver modules T4–T8 which operate in the upstream direction VPS with respect to the MPh-Utopia interface are provided in the first physical layer PL1 in order to switch through the signals transmitted by the first Utopia Level 1 interface unit UL1, in particular the first data signal RxData1, the first cell start signal RxSoc1 and the first ready signal RxClav1. Each of the outputs between the fourth and eighth tristate driver modules T4–T8 and the first, second and third tristate driver modules T1–T3 can be changed to the "tri-stated" or "high impedance" state by the fourth to eighth tristate driver modules T4–T8, and the transmission of the first cell start signal RxSoc1 or of the first data signal RxData1 or of the first ready signal RxClav1 is thus routed or prevented. This means that the signals of the physical layer PL1, PL2 which is selected using the first and second address signals RxAdr1/RxAdr2 can be routed to the interface using the fourth to eighth tristate driver modules T4–T8, the transmission of data being suppressed in the physical layer PL1, PL2 which is not authorized for transmission, by the tristate driver modules which are analogously provided on the respective assembly.

The ATM layer ATM-L transmits, by reference to the first and the second address signals RxAdr1, RxAdr2, the binary address of the physical layer PL1, PL2 which is to be addressed or a filler bit sequence F which is standardized by the ATM Forum and transmitted in each case in the clock period after a valid address, in which case, in the invention, the first and second address signals RxAdr1, RxAdr2 are switched onwards to the first decoding unit DE1 delayed by one clock period Fx using the tenth and eleventh delay elements D-FF10/11. The delayed first and second address signals dAdr1/dAdr2 constitute a binary address, with the result that, for example, the second physical layer PL2 is addressed by a first delayed address signal dadr1 which has a logic value "0", and by a second delayed address signal dAdr2 which has a logic value "1", i.e. the combination of the binary information contained in the first and second delayed address signals dAdr1/dAdr2 yields the binary value "10" which corresponds to a value "2" in the decimal system. In addition, the delayed first and second address signals dadr1, dAdr2 are transmitted via connecting lines to the logic connecting device AG and logically connected there, for example using the "AND" gate. The first tristate driver module T1 which switches through the ready signal RxClav is routed by the control signal present at the output e of the logic connecting device AG, the presence of the filler bit sequence F, for example the binary value "11" which is standardized by the ATM Forum and transmitted in each case in the clock period after a valid address, at the inputs i1, i2 of the logic connecting device AG causes the first tristate driver module T1 to be changed to the "tri-stated" or "high impedance" state. Furthermore, for example the delayed, second address signal dAdr2 is additionally transmitted to the second decoding unit DE2 in order to support the generation of control signals or reload signals NS for routing the data DZ to the MPh-Utopia interface.

The delayed first and second address signals dadr1, dAdr2 which are received in the first decoding unit DE1 are decoded and the decoded first and second address signals dadr1, dAdr2 are transmitted both to the third and fourth delay elements D-FF3, D-FF4 and to the respective tristate driver module T4 provided for switching through the first or second ready signals RxClav1, RxClav2, the transmission of the decoded and delayed first address signal dadr1 to the fourth tristate driver module T4 being illustrated explicitly in FIG. 3, for example. The received, decoded and delayed first address signal dadr1 is used in inverted form at the control input si of the fourth tristate driver module T4 to control the switching through of the first ready signal RxClav1. As a result, the presence of the ready signal RxClav1, RxClav2, which is proposed by the ATM Forum, of the physical layer PL which is selected by the transmitted address is achieved at the MPh-Utopia interface, directly in the clock period Fx following the presence of the address, or implemented in compliance with the standard using the method according to the invention. Furthermore, the decoded and doubly delayed first and second address signals dAdr1, dAdr2 are transmitted to the respective glue logic unit GLE of the respective physical layer PL1, PL2. The signaling to the first or second physical layer PL1, PL2 by the decoding of the delayed first and second address signals dadr1, dAdr2 is not influenced by the second delay of the decoded and delayed first and second address signals dAdr1, dAdr2.

The release/blocking signal RxEnb which is transmitted by the ATM layer ATM-L is switched forward delayed by the length of one clock period Fx using the first delay means D-FF1, the delayed release/blocking signal dEnb being transmitted to the second and third tristate driver modules T2/T3 in order, in particular, to control the release of the data signal RxData or of the cell start signal RxSoc, i.e. if a delayed release/blocking signal dEnb which has a logic value "0" is present at the respective control unit si of the second and third tristate driver modules T2/T3, the currently present data signal RxData and the currently present cell start signal RxSoc are routed to the MPh-Utopia interface. Furthermore, the delayed release/blocking signal dEnb is transmitted to the second decoding unit DE2, to the glue logic unit GLE of the respective physical layer PL1, PL2 to the control inputs si of the third and fourth delay elements D-FF3, D-FF4 and to the second delay element D-FF2. The delayed release/blocking signal dEnb is delayed by a further clock period Fx using the second delay element D-FF2, and the doubly delayed release/blocking signal ddEnb which is present at the output e of the second delay means D-FF2 is additionally transmitted to the glue logic unit GLE of the respective physical layer PL1, PL2. Furthermore, the previously described delay and/or the storage of the first and second delayed and decoded address signals dAdr1, dAdr2 is controlled using the delayed release/blocking signal dEnb which is transmitted to the control inputs si of the third and fourth delay elements D-FF3, D-FF4.

In the glue logic unit GLE of the respective physical layer PL1, PL2—in FIG. 3 in particular the first physical layer PL1—the delayed and the doubly delayed release/blocking signal dEnb, ddEnb, the doubly delayed and decoded address signal dadr1 and in addition the ready signal RxClav1, which is transmitted by the Utopia Level 1 interface unit UL1, as well as the first ready signal dClav1, which is delayed using the fifth delay element D-FF5, are logically connected and a delayed logic release/blocking signal 1dEnb is generated. The delayed logic release/blocking signal 1dEnb is transmitted to the Utopia Level 1 interface unit UL1 in order to route the data from the Utopia Level 1 interface unit UL1 to the MPh-Utopia interface which is adjacent in the upstream direction UPS. In addition, the delayed logic release/blocking signal 1dEnb which is inverted using the inverter I is transmitted to the sixth and seventh delay elements D-FF6, D-FF7 and evaluated therein in order to control the delay of the first and second data signal RxData1, RxData2 and of the first and second cell start signal RxSoc1, RxSoc2 received from the Utopia Level 1 interface unit UL1. The glue logic unit GLE takes into account the signaling operations which are proposed by the ATM Forum and required for controlling different transmission events such as "back-to-back" transmission of ATM cells or "end and restart of cell" transmission, and the corresponding delayed logic release/blocking signal 1dEnb is generated.

The signals which are transmitted by the Utopia Level 1 interface unit UL1 in the first physical layer PL1, in particular the first data signal RxData1, the first cell start signal RxSoc1 and the first ready signal RxClav1 are given different further treatment within the first physical layer PL1. The first data signal RxData1 is thus transmitted both to the eighth tristate driver module T8 directly and to the seventh tristate driver module T6 with a delay using the seventh delay means D-FF7.

Analogously, the first cell start signal RxSoc1 is transmitted both to the seventh tristate driver module T7 directly and to the fifth tristate driver module T5 with a delay using the sixth delay element D-FF6. For example, either the interface signals which are currently transmitted by the Utopia Level 1 interface unit UL1 or the interface signals which are transmitted one clock period Fx before by the Utopia Level 1 interface unit UL1 are transmitted to the eighth and ninth delay elements D-FF8, D-FF9 and thus in the upstream direction UPS as a function of a first reload signal NS1 generated in the second decoding unit DE2 and transmitted to the control input of the seventh and eighth tristate driver modules T7, T8, and as a function of a second reload signal NS2 generated in the second decoding unit DE2 and transmitted to the control input of the fifth and sixth tristate driver modules T5, T6. As a result, the selection of the data words DW which are currently to be routed to the MPh-Utopia interface is defined using the first and second reload signals NS1, NS2 which are generated in the second decoding unit DE2. Analogously, a third and fourth reload signal NS3, NS4 are generated by the second decoding unit DE2 in order to control the tristate driver device provided in the second physical layer PL2, and transmitted to the second physical layer PL2—not explicitly illustrated in FIG. 3. The data signal RxData which is currently transmitted to the ninth delay element D-FF9, and the cell start signal RxSoc which is currently transmitted to the eighth delay element D-FF8 are indicated, delayed by one clock period, to the third and/or second tristate driver module T3, T2 and subsequently routed, under the control of the delayed release/blocking signal dEnb, to the MPh-Utopia interface, i.e. these signals which are currently present at the delay elements D-FF8, D-FF9 are sampled and are thus present in a stable fashion in the subsequent clock period Fx at the MPh-Utopia interface for further processing by the ATM layer ATM-L. To do this, the first and second data signals RxData1, RxData2 or cell start signal RxSoc1, RxSoc2 are each subjected to an OR operation to form a common data signal RxData and a common cell start signal RxSoc, i.e. the cell start signal RxSoc and the data signal RxData each represent the control signal pair RxSoc1, RxData1 or RxSoc2, RxData2 of a physical layer PL1, PL2.

The first ready signal RxClav1 which is transmitted by the Utopia Level 1 interface unit UL1 is switched through to the first tristate driver module T1 by the fourth tristate driver module T4 which is controlled using the inverted, delayed and decoded first address signal dadr1, the logic OR connection between the first and second ready signals RxClav1, RxClav2 being implemented using the pull-down resistor PDR, i.e. when neither a first nor a second ready signal RxClav1, RxClav2 which represents a data transmission request is present, the signal which is present at the input i of the first tristate driver module T1 is changed to the logic state "0" using the pull-down resistor PDR. The ready signal RxClav which is routed to the clocked MPh-Utopia interface is routed to the ATM layer in the clock period Fx using the first tristate driver module T1, in which ATM layer the filler bit sequence F is present as an address signal RxAdr1, RxAdr2 at the MPh-Utopia interface.

In order to implement the invention, the delayed release/blocking signal dEnb, and for example the delayed second address signal dAdr2 are evaluated in the second decoding unit DE2, i.e. they are suitably delayed, multiplexed, decoded and a first, second, third and fourth reload signal NS1/2/3/4 are derived from the acquired information in order to perform time-critical routing of the respective data to the clocked MPh-Utopia interface. Furthermore, the delayed first and second address signals dadr1, dAdr2 which are received in the first decoding unit DE1 are decoded, for example according to the following decoding rule:

| dAdr2 | dAdr1 | DE1 (e2) | DE1 (e1) |
|---|---|---|---|
| 0 | 0 | 1 | 1 |
| 0 | 1 | 1 | 0 |
| 1 | 0 | 0 | 1 |
| 1 | 1 | 1 | 1 |

Figure 4:
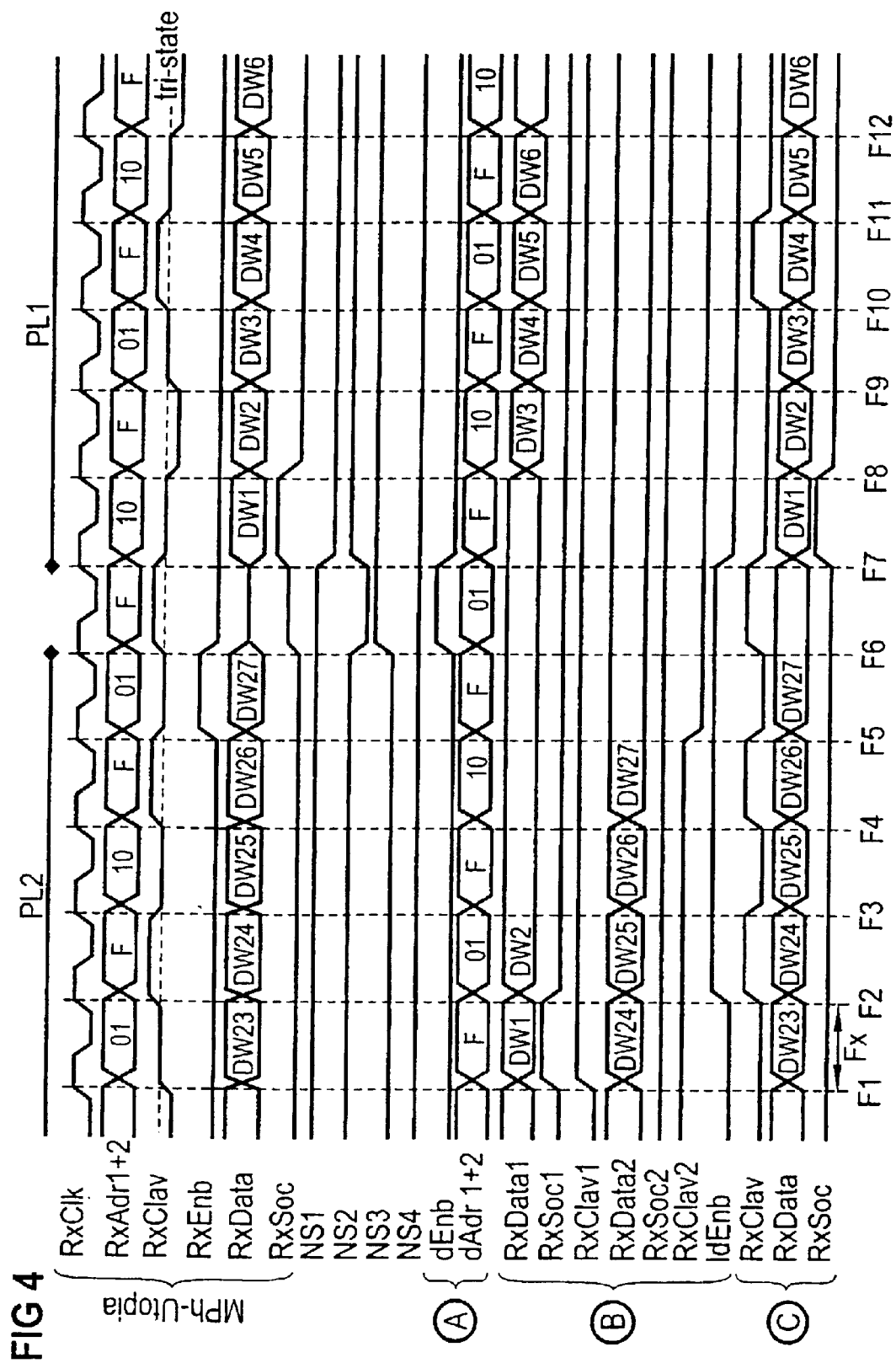
FIG. 4 shows the signal flow at the clocked "multiphysical" UTOPIA interface.

The signal flow which occurs in the time-critical routing according to the invention of data words DW from data cells DZ to the clocked MPh-Utopia interface is illustrated in FIG. 2 with reference to individual signal flowcharts. In compliance with the "multiphysical" UTOPIA interface standard, the signaling signals RxClk, RxData, RxSoc, RxClav, RxAdr1+2, RxEnb are each sampled after a rising clock pulse edge F1–F12, first to twelfth rising clock pulse edges F1–F12 being illustrated by way of example in FIG. 4. In order to explain the invention, eleven clock periods Fx are shown between the first to twelfth positive clock pulse edges F1–F12, an individual clock pulse edge F1–F12 being indicated in each case by a dotted line. Furthermore, the signal profiles of selected signaling signals RxClk, RxData, RxSoc, RxClav, RxAdr1+2, RxEnb, dEnb, ddEnb, NS1-NS4, dAdr1+2, RxData1, RxData2, RxSoc1, RxSoc2, RxClav1, RxClav2, 1dEnb are shown in FIG. 4, within the ATM communications device ATM-KE (indicated in FIG. 3 by a dashed line designated by A), at the Utopia Level 1 interface unit UL1 (indicated in FIG. 3 by a dashed line designated by B), and just before the switching through of the interface signals to the clocked MPh-Utopia interface (indicated in FIG. 3 by a dashed line designated by C), and the entirety of the standardized MPh-Utopia interface signals are illustrated (indicated in FIG. 3 by a dashed line designated by MPh-Utopia), and are designated below as a first interface A, as a second interface B and as a third interface C and a clocked MPh-Utopia interface. The signal profiles at the illustrated interfaces A/B/C/MPh-Utopia of the clock signal RxClk, of the data signal RxData, of the cell start signal RxSoc, of the ready signal RxClav, of the first and second address signals RxAdr1+2, of the delayed first and second address signals dAdr1+2, of the release/blocking signal RxEnb, of the delayed release/blocking signal dEnb, of the first, second, third and fourth reload signals NS1-NS4, of the first and second data signals RxData1, RxData2, of the first and second cell start signals RxSoc1, RxSoc2, of the first and second ready signals RxClav1, RxClav2 and of the connected, logic release/blocking signal 1dEnb are explained in more detail by FIG. 4.

At the time of the first rising clock pulse edge F1 and/or at the time between the first and second rising clock pulse edge F1, F2, the first physical layer PL1 is addressed with the address "01" by the ATM layer ATM-L using the first and second address signals RxAdr1+2 which represent the binary value "01", and said first physical layer PL1 is requested to indicate its readiness to transmit data to the ATM layer ATM-L using the ready signal RxClav. At the time in question, a first data word DW1 is available for the parallel transmission in the addressed, first physical layer PL1 and/or in the Utopia Level 1 interface unit UL1, according to standard practice 27 data words DW1–DW27 being provided in the invention for the transmission of one data cell DZ. Analogously, the first data signal RxData1 at the second interface B indicates the presence of a first data word DW1, and the first cell start signal RxSoc1 has the logic value "1" exclusively in the clock period Fx in question. Approximately simultaneously, the first ready signal RxClav1 assumes the logic value "1", which indicates the readiness to transmit of the first physical layer PL1. Furthermore, the 23rd data word DW23 of the data cell DZ to be transmitted is routed to the clocked MPh-Utopia interface by the second physical layer PL2, currently authorized to transmit data, using the data signal RxData, i.e. the 23rd data word DW23 which is routed to the third interface C by the second physical layer PL2 using the third tristate driver module T3 is connected through to the clocked MPh-Utopia interface by the release/blocking signal RxEnb having a logic value "0". In addition, the second ready signal RxClav2 indicates the continuing readiness to transmit data words DW by assuming the logic value "1". In order to ensure that the next data word DW24 is reloaded in the second physical layer PL2, the third reload signal NS3 has the logic value "0", and the fourth reload signal NS4 has the logic value "1", a reload signal NS1-NS4 which has the logic value "1" switching the output e of the respective tristate driver device T5–T8 to a "high impedance" or "tri-stated" state and/or a reload signal NS1–NS4 which has the logic value "0" switching through the signals present at the input i of the respective tristate driver device T5–T8. By means of the delayed logic release/blocking signal 1dEnb which indicates a data transmission and has the logic value "0", a release of the clocked MPh-Utopia interface is indicated to the Utopia Level 1 interface unit UL1, and the release brings about the reloading of a second data word DW2 at the start of the next clock period although the first physical layer PL1 has not yet been addressed by the ATM layer ATM-L in order to transmit data. The delayed first and second address signals dadr1, dAdr2 which are present at the first interface A have the filler bit sequence F, which causes the ready signal interface line RxClav-L to be changed to the "tri-stated" state and which is clarified in FIG. 4 by means of the "high impedance" ready signal RxClav which is present at the clocked MPh-Utopia interface. In addition, the delayed release/blocking signal dEnb which has a logic value "0"—current data transmission—is present at the first interface A, as a result of which the second and the third tristate driver modules T2, T3 are made to switch through the signals RxData/RxSoc present at their inputs i.

At the time of the second rising clock pulse edge F2, the delayed release/blocking signal dEnb has the logic value "0"—current data transmission—at the first interface A, and the delayed first and second address signals RxAdr1+2 have the binary value "01". After the decoding of these binary "01" address signals dAdr1+2 by the first decoding unit DE1, the decoded and delayed first address signal dadr1 is transmitted to the control input si of the fourth tristate driver module T4 and brings about switching through of the first ready signal RxClav1 to the third interface C. The ready signal RxClav which is present at the clocked MPh-Utopia interface thus has the logic value "1", and the readiness to transmit data to the physical layer PL1 previously addressed in the clock period Fx is indicated the controlling ATM layer ATM-L. Analogously to the previous clock period Fx, at the time of the second rising clock pulse edge F2, the release/blocking signal RxEnb at the clocked MPh-Utopia interface has the logic value "0"—current data transmission—and the 53rd data word DW53 which is present at the third interface C is routed to the clocked MPh-Utopia interface using the data signal RxData. Furthermore, the first cell start signal RxSoc1 which is present at the second interface B has, as standard practice, the logic value "0" because the second data word DW2 is routed in the upstream direction UPS by the Utopia Level 1 interface unit UL1 using the first data signal RxData2, and the first cell start signal RxSoc1 assumes the logic value "1" only approximately at the same time as the transmission of the first data word DW1. In addition, the readiness to transmit data is also indicated by the first ready signal RxClav1 and by the second ready signal RxClav2, the first ready signal RxClav1 being routed to the clocked MPh-Utopia interface in the clock period Fx following the second rising clock pulse edge F2 using the first and fourth tristate driver modules T1, T4. Analogously, the second cell start signal RxSoc2 has the logic value "0" and the 25th data word DW25 is routed to the second interface B by the Utopia Level 1 interface unit UL1 provided analogously in the second physical layer PL2, using the second data signal RxData2. By means of the delayed logic release/blocking signal 1dEnb which assumes the logic value "1" in the current clock period Fx, the Utopia Level 1 interface unit UL1 is instructed not to route any further data words DW to the second interface B in the next clock period Fx, and the sixth and seventh delay elements D-FF6, D-FF7 store the logic value, previously present in each case in the clock period Fx, of the first data signal RxData1 and of the first cell start signal RxSoc1, i.e. the signal constellation during the transmission of the first data byte DW1. In this way, the ready signal RxClav which has a logic value "1", the data signal RxData which represents the 24th data word DW24 and the cell start signal RxSoc which has the logic value "0" are present at the third interface C. The signal constellation of the reload signals NS1–NS4 which are provided for reloading the data to the third interface C has not changed in the clock period Fx in question.

At the time of the third rising clock pulse edge F3, the ATM layer ATM-L interrogates the second physical layer PL2 with the binary address "10" with respect to the presence of data words DW using the first and second address signals RxAdr1+2, i.e. the 26th data word DW26 is routed to the second interface B using the second data signal RxData 2 on the basis of the second ready signal RxClav2 which is present at the second interface B and has a logic value "1". The first data signal RxData1 has, as it already did one clock period Fx before, the logic value of the second data word DW2, especially because no further data were routed to the second interface B by the Utopia Level 1 interface unit UL1 owing to the logic value "1" of the delayed logic release/blocking signal 1denb. The ready signal RxClav which has a logic value "0", the data signal RxData which represents the 25th data word DW25 and the cell start signal RxSoc which has the logic value "0" are thus present at the third interface C. The delayed first and second address signals dAdr1+2 assumes the value of the filler bit sequence F, as a result of which the first tristate driver module T1 which is routed by the control signal present at the output e of the logic connecting means AG switches the ready signal interface line RxClav-L to the "tri-stated" state and suppresses the switching through of the ready signal RxClav which is present at the input i of the first tristate driver module T1 or at the third interface C. The signal profile of the further signaling signals, in particular of the reload signals NS1–NS4 provided for reloading the data to the third interface C has again not changed in the clock period Fx in question.

At the time of the fourth rising clock pulse edge F4, the ATM layer ATM-L transmits the standardized filler bit sequence F using the first and second address signals RxAdr1+2, and the delayed first and second address signals dAdr1+2 transmits the ready signal RxClav which is present one clock period Fx before and is associated with the binary address "10", the signal being namely the second ready signal RxClav2, to the third interface C and ultimately to the clocked MPh-Utopia interface, i.e. the ready signal RxClav, which is present at the clocked MPh-Utopia interface has the logic value "1". Consequently, the second ready signal RxClav2, which is routed to the second interface unit B by the Utopia Level 1 interface unit UL1 provided in the second physical layer PL2, also assumes the logic value "1". Furthermore, the 27th data word DW27 is routed to the second interface B using the second data signal RxData2, and the data signal RxData or cell start signal RxSoc which is delayed by one clock period Fx using the ninth or eighth delay elements D-FF8, D-FF9 is routed to the third interface C. The ready signal RxClav which has a logic value "1", the data signal RxData which represents the 26th data word DW26 and the cell start signal RxSoc which has the logic value "0" are thus present at the third interface C. Analogously to the signal flowcharts in the preceding clock period Fx, the second data word DW2 is in turn routed to the second interface B using the first data signal RxData1 on the basis of the delayed logic release/blocking signal 1dEnb having a logic value "1". As for the further signal flowcharts which are not described explicitly, no changes have occurred at the time of the fourth rising clock pulse edge F4.

At the time of the fifth rising clock pulse edge F5, the release/blocking signal RxEnb is set to the logic value "1"—no data transmission—at the time of the fifth rising clock pulse edge F5 approximately simultaneously with the reception of the 27th and at the same time last data word DW27 of the data cell DZ transmitted using the data signal RxData, and thus the currently present 27th data word DW27 is transmitted and the transmission of data is interrupted until the ready signal RxEnb assumes the logic value "0"—current data transmission. Furthermore, the first and second address signals RxAdr1+2 applies the binary address "01" of the first physical layer PL1 to the clocked MPh-Utopia interface and the delayed first and second address signals dAdr1+2 which have the value of the filler bit sequence F change, according to standard practice, the ready signal interface line RxClav-L to the "tri-stated" state using the logic connecting means AG, as a result of which the first physical layer PL1 is selected for data transmission. The second ready signal RxClav2 with the logic value "0"—no data present at that particular time—is transmitted to the second interface B approximately simultaneously with the transmission of the 27th data word DW27. However, the 27th data word DW27 which is routed last to the second interface B using the second data signal RxData2 is also transmitted to the second interface B. The signal profile of the first, second, third and fourth reload signals NS1–NS4 and of the other interface signals does not have any changes. The ready signal RxEnb which has the logic value "0", the data signal RxData which represents the 27th and at the same time last data word DW27 of the data cell DZ and the cell start signal RxSoc which has the logic value "0" are thus present at the third interface C.

In contrast, at the time of the sixth rising clock pulse edge F6 or in the clock period Fx following the change in the release/blocking signal RxEnb, the routing of data words DW to the clocked MPh-Utopia interface is interrupted using the delayed release/blocking signal dEnb which has the logic value "1" and is present at the first interface A, i.e. both the data signal interface line RxData-L and the cell start signal interface line RxSoc-L are changed to the "tri-stated" or "high impedance" state using the third and fourth tristate driver modules T3, T4. The release/blocking signal RxEnb which has the logic value "0"—current data transmission—is routed to the clocked MPh-Utopia interface by the ATM layer ATM-L on the basis of the ready signal RxClav having a logic value "1" and the readiness to transmit, indicated thereby, of the first physical layer PL1. Approximately at the same time, the second reload signal NS2 assumes the logic value "0" which brings about the switching through of the first data signal RxData1 which is stored or delayed, for example, for five clock periods Fx and has the first data word DW1, and of the associated first cell start signal RxSoc1 which has the logic value "1" to the third interface C via the eighth or ninth delay element D-FF8, D-FF9. This ensures that the first data word DW1 is transmitted with appropriate clocking from the ATM layer ATM-L to the clocked MPh-Utopia interface using the release/blocking signal RxEnb and the first and second address signals RxAdr1+2 after the assignment of the transmission authorization to the first physical layer PL1. The first ready signal RxClav1 is transmitted from the Utopia Level 1 interface unit UL1 to the third, and subsequently to the clocked MPh-Utopia interface via the second interface B on the basis of the delayed first and second address signals dAdr1+2 which represent the binary address "01". Furthermore, the transmission of the first data signal RxData1 which represents the value of the second data word DW2 at a particular time continues to be suppressed using the first reload signal NS1 having the logic value "1". After the termination of the transmission of data from the second physical layer PL2 to the ATM layer ATM-L, the third reload signal NS3 is set to the logic value "1", and the transmission of the previously mentioned signals is thus interrupted by the tristate driver modules which are provided in the second physical layer PL2 for switching through the second data signal RxData2 and the second cell start signal RxSoc.

At the time of the seventh rising clock edge F7, the delayed release/blocking signal dEnb routes the data signal RxData which represents the first data word DW1 or the cell start signal RxSoc which has the logic value "1" to the clocked MPh-Utopia interface using the second and third tristate driver modules T2, T3, the start of a data cell DZ being signaled to the ATM layer ATM-L by the cell start signal RxSoc having the logic value "1". In addition, the first and second address signals RxAdr1+2 indicate a binary address "10", in which case, analogously to the preceeding clock periods, the transmission readiness of the respective physical layer PL1, PL2 is checked cyclically, and/or the first or second ready signal RxClav1, RxClav2 is checked alternately by the ATM layer ATM-L, to determine which physical layer PL1, PL2 is capable, and is particularly authorized to route further data to the clocked MPh-Utopia interface after the termination of the current data transmission. Furthermore the delayed logic release/blocking signal 1dEnb which has the logic value "0" is transmitted to the second interface B and/or the Utopia Level 1 interface unit UL1, as a result of which the Utopia Level 1 interface unit UL1 is made to transmit or reload data to the second interface B. In addition the storage or delaying of the currently present first data signal RxData1 or of the first cell start signal RxSoc1 is suppressed by the delayed logic release/blocking signal 1dEnb which is present at the control input of the sixth and seventh delay elements D-FF6, D-FF7. The first reload signal NS1 assumes the logic value "0" and the logic value "1" is assigned again to the second reload signal NS2, as a result of which the first data signal RxData1 which is currently present at the second interface B and/or the first cell start signal RxSoc1 are reloaded directly to the third interface C via the eighth and ninth delay means D-FF8, D-FF9. Consequently, the ready signal RxClav which has a logic value "0", the data signal RxData which represents the first data word DW1 and the cell start signal RxSoc which has the logic value "1" are present at the third interface C.

At the time of the eighth rising clock pulse edge F8, the change of the physical layer PL1/2 which is authorized for transmission, in particular the change from the second to the first physical layer PL2/1 in FIG. 4 is completely finished, i.e. data is routed from the first physical layer PL1 to the clocked MPh-Utopia interface until blocking of the clocked MPh-Utopia interface is signaled by the release/blocking signal RxEnb of the ATM layer ATM-L. Furthermore, the first data signal RxData1 which represents the third data word DW3 and the first cell start signal RxSoc1 which has a logic value "0" is routed to the second interface B from the Utopia Level 1 interface unit UL1. The ready signal RxClav which has a logic value "0", the data signal RxData which represents the second data word DW2 and the cell start signal RxSoc which has a logic value "0" are routed to the third interface C. Apart from this, no change has occurred in terms of the signal profiles present one clock period Fx before, the address of the first and second physical layers PL1, PL2 and the filler bit sequence F being transmitted alternately in accordance with the statements above, using the first and second address signals RxData1+2 and the delayed first and second address signals dAdr1+2. This alternating interrogation (known by the term "polling" in the specialist field) of the first and second physical layers PL1, PL2 with respect to the readiness to transmit data is realized according to standard practice by the invention.

Furthermore, the "polling" which proceeds in the following clock periods Fx, in particular at the time of the ninth to twelfth positive clock pulse edges F9–F12, of the different physical layers PL1, PL2 is illustrated in FIG. 4, and the signal profiles of the signal constellations occurring during the transmission of further data words DW, in particular of the third to sixth data words DW3-DW6 are shown in FIG. 4. No further explanations are required of this because the signal profiles change by analogy with the signal profiles in the previously described clock periods Fx.

FIG. 2 and FIG. 4 show, for example, the signal flow for one of a multiplicity of interface signaling operations which are possible in practice, i.e. all the signaling scenarios which occur in practice are also covered by the method according to the invention.

The application of the invention is not restricted to an ATM communications device ATM-KE or to the standardized UTOPIA interface or "multiphysical" UTOPIA interface but rather can perfectly well be used to implement suitable asynchronous interfaces in which time-critical routing of the data to a clocked interface is provided, for example the modified UTOPIA 4 (IP packet) or PCI interfaces.

List of Reference Symbols

| | |
|---|---|
| A | First interface in FIGS. 3, 4 |
| AG | Logic connecting means |
| ATM-KE | ATM communications device |
| ATM-L | ATM layer |
| B | Second interface in FIGS. 3, 4 |
| C | Third interface in FIGS. 3, 4 |
| dAdr1 | Delayed first address signal |
| dAdr2 | Delayed second address signal |
| dClav1 | Delayed first ready signal |
| ddEnb | Doubly delayed release/blocking signal |
| de,e | Delay means output |
| DE1, DE2 | First/second decoding unit |
| dEnb | Delayed release/blocking signal |
| dEnb&Clav | Reload signal |
| D-FF - D-FF11 | Delay means |
| di, i | Delay means input |
| DW, DW1, DW2 ... | Data words |
| DZ | Data cells |
| e,e1,e2,e3,e4 | Outputs |
| F | Filler bit sequence |
| F1 - F12 | Clock edges |
| Fx | Clock period |
| GLE | Glue logic unit |
| I | Inverter |
| i,i1,i2,i3,i4 | Inputs |
| i1 | First input of the AG |
| i2 | Second input of the AG |
| ldEnb | Delayed logic release/blocking signal |
| MPh-Utopia | "Multiphysical" Utopia interface |
| NS, NS1-NS4 | Reload signals |
| PDR | Pull-down resistor |
| PL | Physical layer |
| PL1 | First physical layer |
| PL2 | Second physical layer |
| RxAdr1 | First address signal |
| RxAdr1-L | First address signal line |
| RxAdr2 | Second address signal |
| RxAdr2-L | Second address signal line |
| RxClav | Ready signal |
| RxClav1/2 | First/second ready signal |
| RxClav-L | Ready signal line |
| RxClk | Clock signal |
| RxClk-L | Clock signal line |
| RxData | Data signal |
| RxData1/2 | First/second data signal |
| RxData-L | Data signal line |
| RxEnb | Release/blocking signal |
| RxEnb-L | Release/blocking signal line |
| RxSoc | Cell start signal |
| RxSoc1/2 | First/second cell start signal |
| RxSoc-L | Cell start signal line |
| S1 | First interface in FIGS. 1, 2 |
| S2 | Second interface in FIGS. 1, 2 |
| si | Control input of the delay means |
| SL1, SL2 | First/second control line |
| T, T1 - T8 | Tristate driver modules |
| UE, UE1, UE2 | Transmission unit |
| UL1 | Utopia Level 1 interface unit |
| UPS | Upstream direction |
| Utopia | Utopia interface |
| ZE | Access unit |

What is claimed is:

1. A method for the time-critical routing of data to a clocked-interface with asynchronous data transmission, comprising:

parallelly transmitting data between a physical layer and an ATM layer in accordance with a standardized layer model, of a ready signal which is generated by the physical layer and indicates or does not indicate a data transmission request, and of a release/blocking signal which is generated by the ATM layer to route the data transmission; and reacting to a change in the release/blocking signal or in the ready signal within at least one clock period, wherein the release/blocking signal is indicated to the physical layer delayed by one clock period, and the data which is to be transmitted in parallel is routed a priori to the clocked interface by the physical layer, and a reload signal for routing the data to the interface in a timed and clocked fashion is generated by a logic connection of the delayed release/blocking signal and of the ready signal which is generated by the physical layer.

2. The method as claimed in claim 1, wherein when the reload signal indicates a data transmission, additional data is routed to the interface, and when the reload signal indicates no data transmission, the data and not the additional data is routed to the interface.

3. The method as claimed in claim 1, wherein the logic connection of the delayed release/blocking signal and of the ready signal which is generated by the physical layer is carried out by a logic AND connection.

4. The method as claimed claim 1, wherein the data which is to be transmitted is routed a priori to the clocked interface by the physical layer without a data transmission release of the physical layer being indicated by the ATM layer using the release/blocking signal.

5. The method as claimed claim 1, wherein the clocked interface is implemented as a Utopia interface between the physical layer and the ATM layer of an ATM communications device.

6. A circuit arrangement for the time-critical routing of data to a clocked interface with asynchronous data transmission, comprising:
   a first control unit provided in one physical layer and a second control unit provided in an ATM layer;
   a transmission device for the parallel transmission of data from the physical layer to the ATM layer and for transmitting a ready signal which is generated by the physical layer and indicates or does not indicate a data transmission request, and a release/blocking signal which is generated by the ATM layer;
   a reaction device to react to a change in the release/blocking signal or in the ready signal within at least one clock period;
   a delay device for delaying the release/blocking signal for a length of one clock period and for passing on the delayed release/blocking signal to the physical layer;
   a logic connecting device for logically connecting the delayed release/blocking signal and the ready signal generated by the physical layer to form a reload signal and for passing on a reload signal to the physical layer.

7. The circuit arrangement as claimed in claim 6, further comprising a tristate driver device for switching through the data, to be transmitted, from the physical layer to the ATM layer, the tristate driver device controlled by the delayed release/blocking signal.

8. The circuit arrangement as claimed in claim 6, wherein the logic connecting device is implemented by an AND gate, the delayed release/blocking signal being routed to an input, and the ready signal being routed to another input and the reload signal being present at an output of the AND gate to be passed on to the physical layer.

9. A method for time-critical routing of data to a clocked MPh-Utopia interface with asynchronous data transmission, comprising:
   parallelly transmitting data between at least one physical layer and one ATM layer in accordance with a standardized layer model, of at least one ready signal which indicates or does not indicate a data transmission request which is generated by a physical layer in each case, of a release/blocking signal which is generated by the ATM layer to control the data transmission, and of a plurality of address signals which are generated by the ATM layer to address the respective physical layer;
   reacting to a change in the release/blocking signal within at least one clock period;
   indicating the release/blocking signal to the physical layer delayed by at least one clock period;
   delaying the address signals by at least one clock period and the ready signal which is to be indicated to the ATM layer at a given time is selected by reference to the delayed address signals and routed to the clocked MPh-Utopia interface;
   routing the data which is to be transmitted in parallel from the respective physical layer to the clocked MPh-Utopia interface a priori and as a function of the address signals and the release/blocking signal, and immediately sampled; and
   generating at least one first and one second reload signal for routing the data to the MPh-Utopia interface in a suitably timed and clocked fashion by respective logic connections of:the delayed release/blocking signal and of the delayed and decoded address signals for a physical layer in each case.

10. The method as claimed in claim 9, wherein, when there is a first reload signal indicating a data transmission, previously stored data is routed to the MPh-Utopia interface,
   when there is a second reload signal indicating a data transmission, additional data is routed to the MPh-Utopia interface,
   when there is a first or second reload signal indicating no data transmission, the data and no additional data is routed to the MPh-Utopia interface, and
   data is routed to the MPh-Utopia interface either using the first reload signal or the second reload signal.

11. The method as claimed in claim 9, wherein the logic connections of the delayed release/blocking signal and of the delayed address signals are carried out for in each case one physical layer using a decoding unit.

12. The method as claimed claim 9, wherein the data, to be transmitted, of the physical layer selected by reference to the address signals is routed a priori to the clocked MPh-Utopia interface from the respective physical layer without the ATM layer indicating a data transmission release for the respective physical layer using the release/blocking signal by reference to the address signals generated by the ATM layer for addressing the respective physical layer.

13. The method as claimed in claim 9, wherein a reaction to a change in the at least one ready signal occurs at the clocked MPh-Utopia interface.

14. A circuit arrangement for the time-critical routing of data to a clocked MPh-Utopia interface with asynchronous data transmission, at least a first control unit being provided in at least one physical layer and a second control unit being provided in an ATM layer, comprising:
   a device for the parallel transmission of data from at least one of the physical layers to the ATM layer and for the transmission of a ready signal which is generated by a physical layer in each case and indicates or does not indicate a data transmission request, and of a release enable signal which is generated by the ATM layer and of a plurality of address signals which is generated by the ATM layer to address the respective layer;
   a reaction device to react to a change in the release/blocking signal or at least in a ready signal within at least one clock period;
   a first delay element for delaying the release/blocking signal for at least the length of a clock period and for forwarding the delayed release/blocking signal to the physical layer;
   a second delay element for delaying the address signals for at least the length of a clock period and for forwarding the delayed address signals to the physical layer and a decoding device for decoding the address signals; and a logic connection device for logically connecting in each case the delayed lock signal.: and the delayed and decoded address signals are logically connected to form in each case a first and second reload signal for a physical layer in each case, and for forwarding the first and second reload signals to the respective physical layer.

15. The circuit arrangement as claimed in claim 14, wherein at least first and second tristate driver devices for connecting through the data to be transmitted, from in each case one of the physical layers to the ATM layer, the first tristate driver device being controlled by the delayed release/blocking signal (dEnb), and the second tristate driver device being controlled by the first and/or second reload signal.

16. The circuit arrangement as claimed in claim 6, wherein the delay element is implemented by at least one D-flipflop.

17. The circuit arrangement as claimed in claim 14, wherein the logic connection device is implemented by a multiplexer unit and a decoder unit.

18. The circuit arrangement as claimed in claim 14, wherein the clocked MPh-Utopia interface is implemented as a UTOPIA-MPHY interface between a plurality of physical layers and the ATM layer of an ATM communications device.

* * * * *